United States Patent [19]

Thust et al.

[11] 3,816,824

[45] June 11, 1974

[54] METHOD AND ARRANGEMENT FOR OPTICALLY DISPLAYING CHARACTERS CONSTITUTED BY RASTER LIGHT SPOTS ON A PROJECTION SURFACE

[75] Inventors: Walter Thust, Hasloh; Uwe J. Schmidt, Pinneberg, both of Germany

[73] Assignee: U.S. Philips Corporation, New York, N.Y.

[22] Filed: Dec. 1, 1972

[21] Appl. No.: 311,420

[30] Foreign Application Priority Data

Feb. 18, 1972 Germany............................ 2207632

[52] U.S. Cl......................... 340/324 AD, 178/DIG. 3

[51] Int. Cl............................................... G06f 3/14

[58] Field of Search.......... 340/324 AD; 178/DIG. 3

[56] References Cited

UNITED STATES PATENTS

| | | | |
|---|---|---|---|
| 3,140,473 | 7/1964 | Gaffney, Jr. | 340/324 AD |
| 3,161,866 | 12/1964 | Orenstein et al. | 340/324 AD |
| 3,499,980 | 3/1970 | Smierciak | 178/DIG. 3 |
| 3,503,063 | 3/1970 | Starr | 340/324 AD |
| 3,573,787 | 4/1971 | Sandgren et al. | 340/324 AD |

*Primary Examiner*—John W. Caldwell
*Assistant Examiner*—Marshall M. Curtis
*Attorney, Agent, or Firm*—Frank R. Trifari

[57] ABSTRACT

A method of increasing the flicker-free information in dynamic projection of image spots of an image in which the image-spot frequency is limited. The character forming raster of light spots consists of a meshed light spot series which is repeatable at approximately 50 times per second. The position of the first light series is chosen such that the full characters are visible after completion of all the series. Arbitrary energization of the separate image spots allows for a reduction of picture frequency and a flicker-free display.

2 Claims, 3 Drawing Figures

Figure 1:
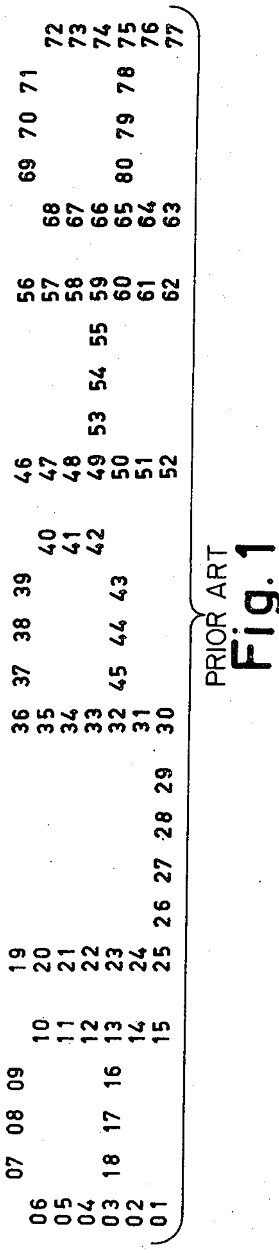
PRIOR ART Fig. 1

METHOD AND ARRANGEMENT FOR OPTICALLY DISPLAYING CHARACTERS CONSTITUTED BY RASTER LIGHT SPOTS ON A PROJECTION SURFACE

The invention relates to a method of optically displaying characters constituted by raster light spots on a projection surface and to an arrangement suitable for this purpose.

In such methods, there is no regular line scanning when displaying information such as, for example, in normal television, but only the image spots required for visualizing the information are scanned, i.e. energized. In arrangement operating with the electron beam, the entire scanning procedure of an image is composed of horizontal and vertical steps. The blanking period between two spots is therefore dependent on the distance between the spots. It is true that relative to the line scanning method, the time required for the information to be displayed once can be shortened by accelerating the electron beam during the blanking period, but display without flicker in principle necessitates a picture repetition frequency of 50 – 60 Hz. This picture frequency determines the maximum information quantity to be displayed at a given scanning rate.

Methods for electron image apparatus employing regular line scanning leading to a reduction of the picture frequency without flickering phenomena are known, inter alia, the interlacing method in television.

An electron beam scanning method is also known, in which parts of a total image are obtained with one single irregular series of spots which are displayed on a phosphor screen having a long persistence period. This, however, does not yield more information per image, but the transmission period per image, and therefore, the bandwidth of the transmission channel, is reduced.

In the optical projection of a film image, the period of the still image being illuminated is interrupted in such a manner, that the total exchange between light and dark of an image takes place approximately 72 times per second, so that to the eye, the displaying image is likewise free from flicker. In contrast therewith, the present invention does not, however, relate to the static projection of an image, but to the dynamic projection of image spots of an image.

The object of the invention is to increase the flicker-free information content in this type of projection in which the image-spot frequency is limited.

According to the invention, this is obtained by a method which is characterized in that the character-forming raster light spots consist of meshed light spot series, which can be repeated at least approximately 50 times per second, and that the position of the first light spot of each series is chosen to be such that the full characters are visible after completion of all series.

The method according to the invention makes possible a reduction of the picture frequency, and yet displays the information without flicker, for an optical display using arbitrary energization of the separate image spots. When displaying characters and lines not all image spots of a character or a line are energized directly after each other, but only intermittently every second, third, etc., image spots, particularly every second, fourth or eighth image spot of a character in corresponding sequences. After, for example, each second, fourth or eighth image spot of all characters to be displayed has been energized in this manner, the other required image spots are made visible. It is true that the total duration for energizing all image spots of one single character is increased, but the time up to each new energization of the character is reduced. This corresponds to an increase of the image-spot frequency, so that for a given image-spot frequency, more information can be displayed.

In order that the invention may be readily carried into effect, some embodiments thereof will now be described in detail, by way of example, with reference to the accompanying diagrammatic drawings in which:

FIG. 1 serves to illustrate a known method, and

Figure 2:
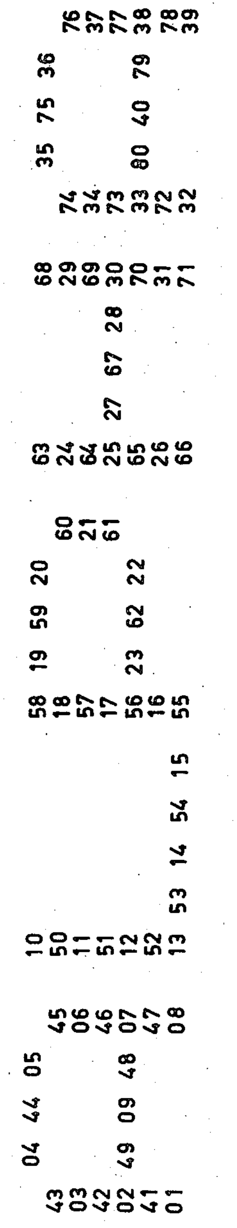
Figure 3:
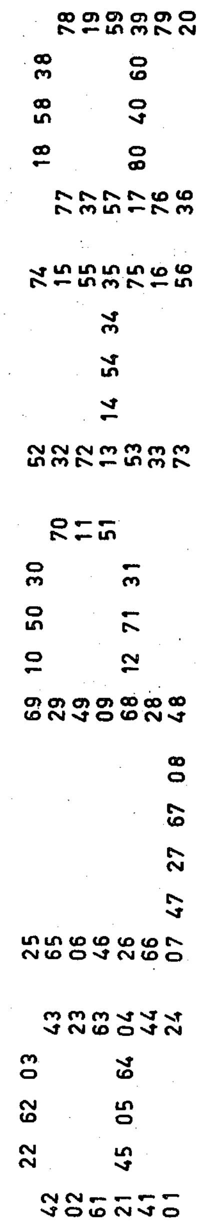

FIGS. 2 and 3 show methods according to the invention.

FIGS. 1, 2 and 3 of the drawing show alphanumerical information which is projected on a projection surface with the aid of a known digital light deflection arrangement, consisting of double-refractive elements provided one after the other, and of polarization switches. The total information consists of 80 picture spots, or light spots, displayed one after the other. The separate picture spots are successively energized in accordance with the given enumeration.

According to FIG. 1, all image spots of a character are made visible one after the other before a new character is initiated, while the light beam from the digital light deflection arrangement is deflected over the corresponding angle, or is parallel shifted. The magnitude of the respective deflection is time-independent, i.e., the switching time between two spots is independent of the distance between the spots.

FIG. 2 shows how firstly every second image spot of the information to be displayed is made visible one after the other in a series of light spots, whereafter the missing intermediate spots are energized in a following series. The enumeration of the image spots of FIG. 3, shows that only every fourth image spot of the image information is rendered visible one after the other, before one of the other three intermediate spots is energized.

The separate meshing light spot series can be repeated at least 50 times per second, so that a flicker-free picture of the information becomes visible on the projection surface.

Any other sequence, for example, the sequence in which only every eighth image spot of information to be displayed is rendered visible, can be easily developed in accordance with the system shown in FIGS. 1 – 3.

In case of coherent light, such as the light radiated by a digital laser light deflection arrangement, the grain structure during projection is disturbing. Some methods of removing the grain are dependent on the staying duration of the light spot on the projection surface. Since, in the method according to the invention, the staying duration of the light spot can be increased, the disturbing influence of the grain structure is reduced. In fact, in case of an equal duration of, for example, 1/50 or 1/60th second for energization of both the light spots 01 up to and including 80 of FIG. 1, and of the light spots 01 up to and including 40 of the first light spot series of FIG. 2, a duration per light spot which is twice as large follows. For FIG. 3, there follows a duration which is four times as large, because only 20 light spots per series are to be energized within the duration of 1/50th or 1/60th second.

To display the largest possible quantity of information without flicker, it is desirable not to increase the duration of the light spots, but to maintain it the same as in FIG. 1. This means that the first light spot series (01 – 40) of FIG. 2 can be extended, by the same number of 40 spots (41–80) in a second light slot series. The result is that double the information shown in FIG. 1, can be displayed on a projection surface without any flicker.

Likewise there follows for FIG. 3, that the four light spot, series each having 20 light spots can each be extended by 60 light spots for the same duration as in FIG. 1, so that the fourfold information of FIG. 1 can be displayed without flicker.

FIG. 3 shows that the first light spots of the four light spot series are placed in the sequence 01, 41, 21, 61. The subsequent fours of light spots are built up in the same manner. This manner of filling the characters results in a better picture quality then when the sequence would have been chosen to be 01, 21, 41, 61, which is caused by the fact that the light spot series further mesh. When using eight light spot series, such meshing for the first light spots thereof, would result for example, in the sequence 01, 41, 21, 61, 11, 51, 31, 71. The said meshing results in a symmetrically performed filling of the characters.

In the case of the light spot number of 80, given by way of example, a subdivision in the light spot series may not only yield an integral number of light spots per series, as in a 2, 4, 6, 8, 10 series, etc. but also unequal numbers such as, for example, in a 3 and a 6 light spot series. In case of a 3 light spot series having 27 light spots in the first two series, and 26 in the third series a sequence of 01, 28, 55, for example, suits the first light spots of the series. In case of a 6 light spot series having 14 light spots in the first and third series, and 13 light spots in the remaining series, a sequence of 01, 28, 55, 15, 42, 68 may be chosen for the light spots of the series, while using the said meshing.

What is claimed is:

1. A method of optically displaying characters on a projection surface by deflecting a beam of light from a light source into character-forming light spots along a pattern which follows shapes of said characters, comprising the steps of deflecting said beam to a first of a plurality of series of spots at predetermined locations along said pattern, then deflecting said beam through a succeeding series of spots of light at locations meshed between the locations of the preceding series along said pattern, the location of the first light spot of each series of said plurality being determined such that full display of said characters results from completion of all of said plurality of series, said method being performed at a frequency of at least approximately 50 series per second.

2. A method as claimed in claim 1, wherein said plurality comprises more than two series, and the location of the first light spot of a succeeding one of said plurality is between the locations of the first light spots of two of the preceding series of the same plurality.

* * * * *

UNITED STATES PATENT AND TRADEMARK OFFICE

CERTIFICATE OF CORRECTION

PATENT NO. : 3,816,824

DATED : June 11, 1974

INVENTOR(S) : WALTER THUST ET AL

It is certified that error appears in the above-identified patent and that said Letters Patent are hereby corrected as shown below:

Column 3, line 11 after "spot" cancel "," (comma) and after "spots" insert --,-- (comma)

Signed and Sealed this

*eighteenth* Day of *May 1976*

[SEAL]

*Attest:*

RUTH C. MASON
*Attesting Officer*

C. MARSHALL DANN
*Commissioner of Patents and Trademarks*